3,227,154
DIAGNOSTIC BAG WITH IMPRESSIONABLE OUTER SURFACE AND METHOD OF USING IT
Galen B. Cook, 1027 Commodore, Richmond Heights, Mo.
Filed May 11, 1962, Ser. No. 193,978
16 Claims. (Cl. 128—2)

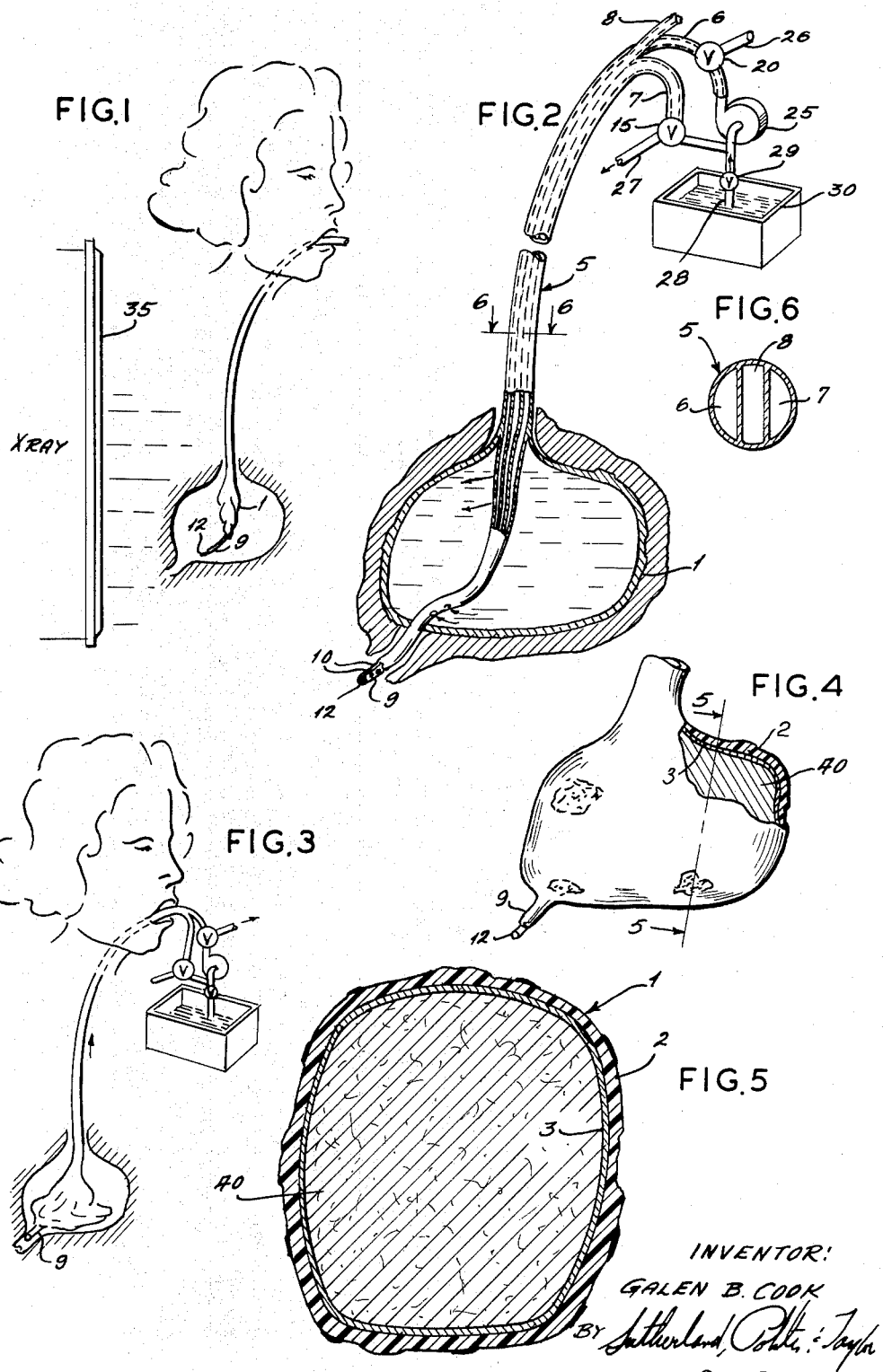

This invention relates to the diagnosis of abnormalities in body cavities. It has particular application to the esophagus, stomach, small intestines, urinary bladder and uterus, but its utility is not confined thereto.

The need for a simple but positive device or method for detecting and recording abnormalities on the walls defining body cavities is evident. A process and material for the diagnosis of abnormalities in the lower gastro-intestinal tract, chiefly the colon, is described in "Surgery," vol. 50, No. 3, pages 513 et seq. While the method and composition there described perform admirably in that area because the resultant mold is readily evacuated, the relative size of the stomach compared to its proximal and distal communications and the different physiologic characteristics of the upper gastro-intestinal tract make the use of the bulky foamed intumescent material of that application impracticable.

One object of this invention is to provide a method and composition by which impressions can be made from the walls of cavities with restricted outlets, such as the stomach.

Another object of this invention is to provide such method and composition which are simple to use, productive of an accurate record, inexpensive, safe, and relatively tolerable to the patient, as compared with methods and devices known heretofore.

Other objects will become apparent to those skilled in the art in the light of the following description and accompanying drawing.

In accordance with this invention, generally stated, diagnosis of abnormalities of the wall of internal body cavities, such as the stomach, is accomplished by introducing to the cavity an expandable and collapsible bag the outer surface of which is characterized by being softenable at a physiologically tolerable temperature preferably above normal body temperature, and sufficiently settable at a physiologically tolerable lower temperature so that the outside surface of the bag may receive impressions from the wall of the cavity at the higher temperature, and the impressions can be retained and recorded in the outer wall of the bag by setting it, in place, at the lower temperature. The steps of the process include the inserting of the bag into the body cavity, the expanding of the bag to put its outer surface into contact with the cavity-defining wall, the warming of the outer surface of the bag to impression-receiving temperature, the forming of the impression, the cooling of the outer surface of the bag, the collapsing of the bag and its removal.

The impressionable-settable outer surface of the bag is preferably formed of plastic of such a character that it will not melt at body temperature, but will soften at a temperature only a few degrees above normal body temperature (e.g. 38°–50° C.), and will harden to impression-retaining condition, but retain its flexibility, at a temperature a few degrees below normal body temperature (e.g. 37°–20° C.). Preferably, also, the outer surface becomes somewhat tacky at the softening temperature, so that it will pick up sloughing cells from the cavity-defining wall and retain them. The outer surface should be thick enough to accommodate a suspected abnormality. It must, in addition, be nontoxic and substantially inert with respect to body fluids in the particular body cavity in which it is to be used.

If the outer surface plastic has sufficient strength and impermeability to hold the expanding medium (generally water), the bag can be made with a single homogeneous wall. Normally, however, it is found more satisfactory to use a multiwall bag, of which the impressionable plastic forms the outer layer. In the preferred embodiment, two layers are provided, both formed of the same type components so that the two layers are compatible, but the inner layer is so compounded as to be less softenable at the operating temperature and more strongly integrious. However, it is quite feasible to use two dissimilar layers, or to use a multiplicity of inner layers. Thus, for example, if it were desired to provide a positive limit on the amount of distension to which the cavity-defining body wall is subjected, one of the inner layers could be of a substantially inextensible material, such as cloth or a non-stretching plastic. Even the outermost layer can be plural, in the sense that a thin coat of either relatively sticky material, or of a parting material can be applied, in the first instance to facilitate entrapment of cells, in the second, to facilitate separation from the cavity wall.

The necessary thickness of the outer layer depends upon the nature of the body cavity, the nature and size of any expected abnormality and the structural characteristics of the bag. In the preferred embodiment, the outer impressionable layer is .04 to 0.1 inch thick, the inner, structural liner layer, .005 to 0.01 inch.

Preferably also, a radiopaque material is incorporated in the wall of the bag. It can be made a part of any or all of the layers of a multilayer bag, can be laminated between layers, or put on as a coating, inside or out.

In the drawing, FIGURE 1 is a diagrammatic view, partly in section, showing the diagnostic bag being placed into position in the stomach of a subject;

FIGURE 2 is a diagrammatic view, partly broken away, showing the bag in its impression-receiving and retaining condition within the stomach, with a pump supplying warm and then cold water to it;

FIGURE 3 is a diagrammatic view showing the collapsing of the impressed bag by the pumping out of the water;

FIGURE 4 is a view in side elevation, partly broken away, of the impressed bag reexpanded and filled with permanent filler;

FIGURE 5 is a sectional view taken along the line 5—5 of FIGURE 4; and

FIGURE 6 is a sectional view taken along the line 6—6 of FIGURE 2.

Referring now to the drawing for one illustrative example of apparatus of this invention, reference numeral 1 indicates a bag which is shown exaggeratedly in FIGURES 4 and 5 as having an outer, impressionable layer 2 and an inner, structural liner 3.

In practice, as is indicated in the discussion of the composition of the impressionable layer and inner structural liner, the two are so related chemically as to form what would appear to be a unitary wall.

The bag 1 is sealed around the outside of a triple lumen tube 5. The triple lumen tube 5 is made up of a fluid supply tube 6, a fluid exhaust tube 7 and a distal aspiration tube 8. The lower ends of the fluid supply tube 6 and the fluid exhaust tube 7 are sealed off inside the bag 1. The distal aspiration tube 8 projects, in an appendix 9, beyond the confines of the bag 1, which is sealed around it to form a fluid tight seal with it. The appendix of the distal aspiration tube has ports 10 in it, which are intended to communicate with the part of the gastro-intestinal tract distal to the bag 1 when the bag is in use. At the lowermost end of the appendix 9 of the tube 8, a small piece or tip 12 of magnetic material is sealed in. The magnetic material may, but need not be a magnet, but it must be attracted by a magnet.

At the upper end of the tube 5, the distal aspiration tube 8 communicates with an aspirator, not here shown; the fluid exhaust tube 7 communicates with a two way valve 15, and the fluid supply tube 6 communicates with a two way valve 20.

The valve 20 is arranged so that when turned to one position the tube 6 communicates with the discharge side of a pump 25, and when turned the other way, the tube 6 communicates with the atmosphere, and the discharge side of the pump 25 communicates with a discharge port 26. The valve 15 is arranged so that it communicates always with the exhaust tube 7, and when turned one way, it communicates with an exhaust port 27, and when turned the other way, communicates with the suction side of the pump 25. The suction side of the pump 25 also communicates by way of a suction line 28, through a valve 29, with a fluid reservoir 30.

In FIGURE 1, an X-ray screen 35 is shown diagrammatically, to indicate that the position of the bag 1 can be guided and determined by the use of X-rays.

In FIGURES 4 and 5, the bag 1 is shown as being filled with a filler material 40.

Much of the following general discussion has particular but by no means exclusive application to the two-layer, compatible-component bags of the illustrative examples. The bags of the illustrative examples are made up of an outer impressionable layer and an inner structural liner.

In all of the specific illustrative examples, both the impressionable layer and structural liner are formulated from two components. This is more or less fortuitous, because one or a multiplicity of components may be used, but the illustrative examples are simple and effective. The two components of the impressionable layer and structural liner are a stabilizing component and a molding component. Illustrative suitable stabilizing and molding components are:

Molding components:
  alkyl aryl phosphate
  dioctyl adipate
  dicyclohexyl phthalate
  diphenyl phthalate
  acetyl tributyl citrate
  terpene polymers
  coumarone-indene resins
Stabilizing components:
  ethylene/vinyl acetate copolymers
  acrylic resins
  polyvinyl acetate resins
  polyvinyl butyral resins The impressionable layer must be so formulated that at temperatures below about forty degrees and above twenty degrees centigrade it is dimensionally stable, flexible, non-toxic, odorless or of innocuous odor, water-insoluble and resistant to body fluids and digestive enzymes.

At temperatures above about forty degrees and below sixty degrees centigrade, the impressionable layer must be sensitive to surface pressure, soft, tacky, nontoxic, water-insoluble and resistant to body fluids and digestive enzymes.

The purpose of the inner (structural liner) layer of the bag wall is to maintain the bag's competence as a water (or other expanding medium) container at temperatures between about sixty and forty degrees centigrade where the impressionable layer, by virtue of its soft, thermoplastic character, is not reliable as such a container.

Many thin, strong, elastomeric materials, such, for example as natural and artificial rubbers, may be used for this purpose but in order to assure manufacturing simplicity and guarantee adherence between the impressionable layer and the structural liner, a satisfactory liner can be made from the same kinds of materials as employed in the impressionable layer, and this is done in the illustrative examples. By combining a molding component with a stabilizing component in ratios so that the melting point is at or above sixty degrees centigrade, the structural liner will retain its water-carrying competence to sixty degrees centigrade and thereby function satisfactorily.

It is desirable to incorporate a radiopaque additive into the bag. The purpose of this material is to permit radioscopic localization of the bag when it is within body cavities. To effect this purpose any compatible radiopaque agent may be used. Examples are barium sulfate, Micropaque, Hypaque, Dionosil, etc. Experience has shown three parts per hundred to be satisfactory.

The following explicit examples of suitable formulations for impressionable layers and structural liners are purely illustrative:

EXAMPLE I

Impressionable layer                     Percent
  Polyvinyl butyral ("Butvar 76") _____ 45
  Alkyl aryl phosphate ("Santicizer 141") _____ 55
Structural liner
  Polyvinyl butyral ("Butvar 76") _____ 75
  Alkyl aryl phosphate ("Santicizer 141") _____ 25

EXAMPLE II

Impressionable layer                     Percent
  N-butyl methacrylate polymer ("Lucite 44") __ 65
  Dioctyl adipate ("DOA") _____ 35
Structural liner
  N-butyl methacrylate polymer ("Lucite 44") __ 85
  Dioctyl adipate ("DOA") _____ 15

EXAMPLE III

Impressionable layer                     Percent
  Vinyl acetate resin ("Bakelite AYAC") _____ 90
  Dioctyl adipate ("DOA") _____ 10
Structural liner
  Vinyl acetate resin ("Bakelite AYAC") _____ 98
  Dioctyl adipate ("DOA") _____ 2

EXAMPLE IV

Impressionable layer                     Percent
  Ethylene/vinyl acetate copolymer ("Elvax-240") _____ 25
  Terpene polymer ("Piccolyte 25") _____ 75
Structural liner
  Ethylene/vinyl acetate copolymer ("Elvax-240") _____ 60
  Terpene polymer ("Piccolyte 25") _____ 40

EXAMPLE V

Impressionable layer                     Percent
  Polyvinyl butyral ("Butvar 76") _____ 45
  Alkyl aryl phosphate ("Santicizer 141") _____ 55
Structural liner
  Polyvinyl butyral ("Butvar 76") _____ 75
  Alkyl aryl phosphate ("Santicizer 141") _____ 22
  Barium sulfate _____ 3

*Formation of the bag*

The components of the impressionable layer are blended, with the aid of heat and suitable solvents as required. The components of the structural liner are similarly blended, separately from those of the impressionable layer. The bag, preferably of a size and shape very nearly complementary to that of the body cavity to be filled, is formed in any suitable way. For example, a form can be coated to the desired thickness with the blended components of the structural liner, brought by heat, solvents or both to flowable form, by dipping, spraying or otherwise applying the fluent blend to the form. An over-coat of impressionable layer components, brought by heat, solvent or both to flowable form, is then applied to the structural liner by dipping, spraying or otherwise applying the fluent blend thereto. The layers are strongly adherent to one another, forming an apparently unitary structure. The layers are set by cooling or evaporation of solvent, or both, and the form removed. It can be seen that if slush or slip molding is used, the impressionable layer will be formed first. The two layers may also be combined by extrusion, and a bag could be formed by making a cylinder by extrusion, and closing one or both ends.

When the bag has been formed, it is fixed to innocuous flexible plastic or rubber tubing such as is employed in gastro-intestinal medical applications. The tubing may be made from the same plastic combinations as the structural liner and be formed as an integral part thereof, if desired, as illustrated in the drawing. In such a tube a radiopaque material may be incorporated either through its length, or at regularly spaced intervals, to facilitate observation of its position and that of the bag relative to it. It can be seen that a single lumen tube can be used, but not easily; a double lumen tube is entirely satisfactory as far as circulation in and heating and cooling of the bag is concerned. The desirability of the triple lumen tube illustrated is that by putting the G-I tract distal to the bag in communication with an aspirator, the fluid normally present in the G-I tract (succus entericus) can be withdrawn so that it does not intrude between the outer wall of the bag and the inner wall of the stomach. The tip of magnetic metal 12 (e.g. "Alnico 5") is sealed into the distal end of the tube to allow easy insertion into the area of interest (cf. an article on Magnetic Intubation in "Surgery," November 1961).

In the performance of the method of this invention, the bag is introduced into the body cavity of interest (FIG. 1) and inflated (FIG. 2), in this illustration, with water, using a controlled temperature-volume water source, (here shown diagrammatically). The temperature of the impressionable layer of the bag is raised to about forty-five degrees centigrade by continued circulation of warm water (FIG. 2). The inflation places the balloon walls in contact with the overlying cavity surface and the warming of the impressionable layer to a softened stage effects an imprint. While maintaining controlled volume and pressure, the temperature of the water is reduced to thirty degrees centigrade and the cool water circulated through the bag until the temperature of the impressionable layer is reduced to its impression-retaining state, and the imprint is set (FIG. 2). At forty-five degrees centigrade and higher the bag's surface is tacky and consequently exfoliated cells adhere to it. After the impressionable layer temperature has reached thirty degrees centigrade the water is removed (FIG. 3) by turning the valve 20 to discharge position and valve 15 to the suction side position and closing the valve 29 to pull the water through the fluid exhaust tube 7. When the water is exhausted, the bag is withdrawn from the body cavity. The bag may then be filled with air or other fluent medium for study of its imprinted surface and recovery of adherent cells, or it may be filled or coated with settable foam (e.g. polyurethane), wax, plaster or rubber which is set to obtain a permanent model. The bag wall may be cut with a microtome knife for the purpose of making histologic sections of adherent body cells (cf. FIG. 5).

The methods of forming and using the bags of all the examples are substantially the same.

Numerous variations in the construction and particular modes of use of the bags, within the scope of the appended claims will occur to those skilled in the art in the light of the foregoing disclosure. For example, other expanding media may be employed, such as gas or even fluent pumpable solids, and the bags may be made of various other components. So that the tacky surface of the bag may be stored under warm climatic conditions without adhering to itself, thus preventing its use or interfering with the permanence of its impressions after use, the bag may be stored under refrigeration or it may be coated with an inert, non-toxic tack-inhibitor such as silica (Santicel) or alumina hydrate (Hydral). It may even be coated with a thin, flexible, cover of a digestible material like gelatin, to improve its shelf life.

Different methods of introducing fluids to and exhausting the fluids from the bag may be used, and different "plumbing." Such variations and many others are well within the skill of those skilled in the art.

Having thus described the invention, what is claimed and desired to be secured by Letters Patent is:

1. The method of diagnosis comprising (1) introducing into a body cavity of a living animal a hollow, flexibly collapsible bag, the outer surface of which is substantially physiologically inert and nontoxic and softenable and impressionable at physiologically tolerable elevated temperaure and hardenable to impression-retaining condition at physiologically tolerable reduced temperature, (2) introducing into said bag a liquid warmed to a predetermined temperature, and thereby expanding said bag to bring the said outer surface into contact with the cavity-defining wall, (3) warming said outer surface to impressionable temperature, while maintaining said contact, (4) displacing warm liquid from the bag with relatively cool liquid, and thereby cooling said outer surface to impression-retaining temperature while maintaining said bag in place and in its expanded, wall-engaging, condition in said cavity, (5) contracting said bag and (6) withdrawing said contracted bag from said cavity.

2. A diagnostic device for obtaining impressions of abnormalities in the wall of an internal cavity of a living animal, said device comprising a hollow, flexibly collapsible bag, the outer surface of which is substantially physiologically inert and nontoxic, and of material softenable and impressionable at physiologically tolerable elevated temperature and hardenable to impression-retaining condition at physiologically tolerable reduced temperature while retaining sufficient flexibility to permit collapse of the bag without permanent deformation of said surface, said bag being impermeable by an expanding medium and integrious under the condition of expansion within the limits of the surface defining a cavity into which the bag is placed for diagnostic purposes, and fluid supply and exhaust tubes communicating with the interior of said bag, at least one of said tubes extending substantially within said bag, by means of which tubes fluid can be circulated continuously within said bag while said bag is positioned and expanded within a body cavity.

3. A diagnostic device for obtaining impressions of abnormalities in the wall of an internal cavity of a living animal, said device comprising a hollow flexibily collapsible bag made up of a plurality of layers, an outer of which is substantially physiologically inert and nontoxic and of a material impressionable at physiologically tolerable elevated temperature and hardenable to impression-retaining condition at physiologically tolerable reduced temperature while retaining sufficient flexibility to permit collapse of the bag without permanent deformation of said outer surface, and an inner of which is impermeable by an expanding medium and integrious under the conditions of expansion within the limits of the surface defining a cavity into which the bag is placed for diagnostic purposes, and fluid supply and exhaust tubes communicating with the interior of said bag, at least one of said tubes extending substantially within said bag, by means of which tubes fluid can be circulated continuously within said bag while said bag is positioned and expanded within a body cavity.

4. The device of claim 3 wherein contiguous inner and outer layers are made of chemically coherent compositions.

5. The device of claim 4 wherein the inner and outer layers are made up of terpene polymers and ethylene/vinyl acetate copolymers.

6. The device of claim 2 wherein the outer surface softens to impression receiving condition at between thirty-eight and fifty degrees Centigrade, and hardens to impression-retaining condition but retains its flexibility at between thirty-seven and twenty degrees Centigrade.

7. The device of claim 3 wherein the inner and outer layers are made up of polyvinyl butyral and alkyl aryl phosphate.

8. The device of claim 3 wherein the inner and outer layers are made of n-butyl methacrylate polymer and dioctyl adipate.

9. The device of claim 3 wherein the inner and outer layers are made up of vinyl acetate resin and dioctyl adipate.

10. The device of claim 3 wherein the inner and outer layers are made up of ethylene/vinyl acetate copolymer terpene polymer.

11. The device of claim 2 wherein a radiopaque substance is incorporated into the bag wall.

12. The method of claim 1 wherein the steps of expanding the bag and maintaining the outer surface of the bag in contact with the cavity-defining walls are accomplished while maintaining the region immediately distal to the bag substantially free of intestinal fluid.

13. A diagnostic device for obtaining impressions of abnormalities in the wall of an internal cavity of a living animal, said device comprising a hollow, flexibly collapsible bag of a size to be admitted to a body cavity, the outer surface of which is substantially physiologically inert and nontoxic, softenable and impressionable at physiologically tolerable elevated temperature and hardenable to impression-retaining condition at a psysiologically tolerable reduced temperature while retaining sufficient flexibility to permit collapse of the bag without permanent deformation of said surface, fluid supply and exhaust tubes communicating with the interior of said bag, by means of which fluid can be circulated within said bag while said bag is positioned and expanded within a body cavity, and aspiration means extending beyond said bag and located to communicate between regions of the bag proximal and distal to the said body cavity.

14. The device of claim 13 wherein the aspiration means is a tube which extends entirely through and beyond the said bag, is sealed from communication with the interior of the bag and is open at its distal end.

15. The device of claim 14 wherein the tube is a part of a triple lumen tube two of the passages of which constitute the said fluid supply and exhaust tubes and open into the interior of the bag to permit ingress and egress of fluid.

16. The diagnostic device of claim 2 wherein the outer surface is tacky in its impression receiving state, whereby cells from the wall of the cavity are entrapped in the said surface.

References Cited by the Examiner

UNITED STATES PATENTS

| | | | |
|---|---|---|---|
| 2,497,914 | 2/1950 | Sawyer | 18—42 |
| 2,618,014 | 11/1962 | Sawyer et al. | |
| 2,601,703 | 7/1952 | Sawyer | 264—40 |
| 2,618,014 | 11/1952 | Sawyer | 264—291 |
| 2,701,559 | 2/1955 | Cooper | 128—2 |
| 2,857,915 | 10/1958 | Sheridan | 128—349 |
| 3,046,601 | 7/1962 | Hubbert et al. | |
| 3,046,988 | 7/1962 | Moreau et al. | 128—349 |

OTHER REFERENCES

"Magnetic Intubation" by McCarthy et al. in Surgery, November 1961, vol. 50, No. 5, pp. 740–741.

"The Bulletin" of the Dow Corning Center for Aid to Medical Research vol. 4 No. 1, Midland Michigan, January 1962, Article entitled "The Silicone-Foam Diagnostic Enema," Galen A. Cook 4 pages.

RICHARD A. GAUDET, *Primary Examiner.*

JORDAN FRANKLIN, LOUIS R. PRINCE, *Examiners.*